No. 630,883. Patented Aug. 15, 1899.
J. HARTSHORN.
VEHICLE WHEEL HUB.
(Application filed Aug. 29, 1898.)
(No Model.)
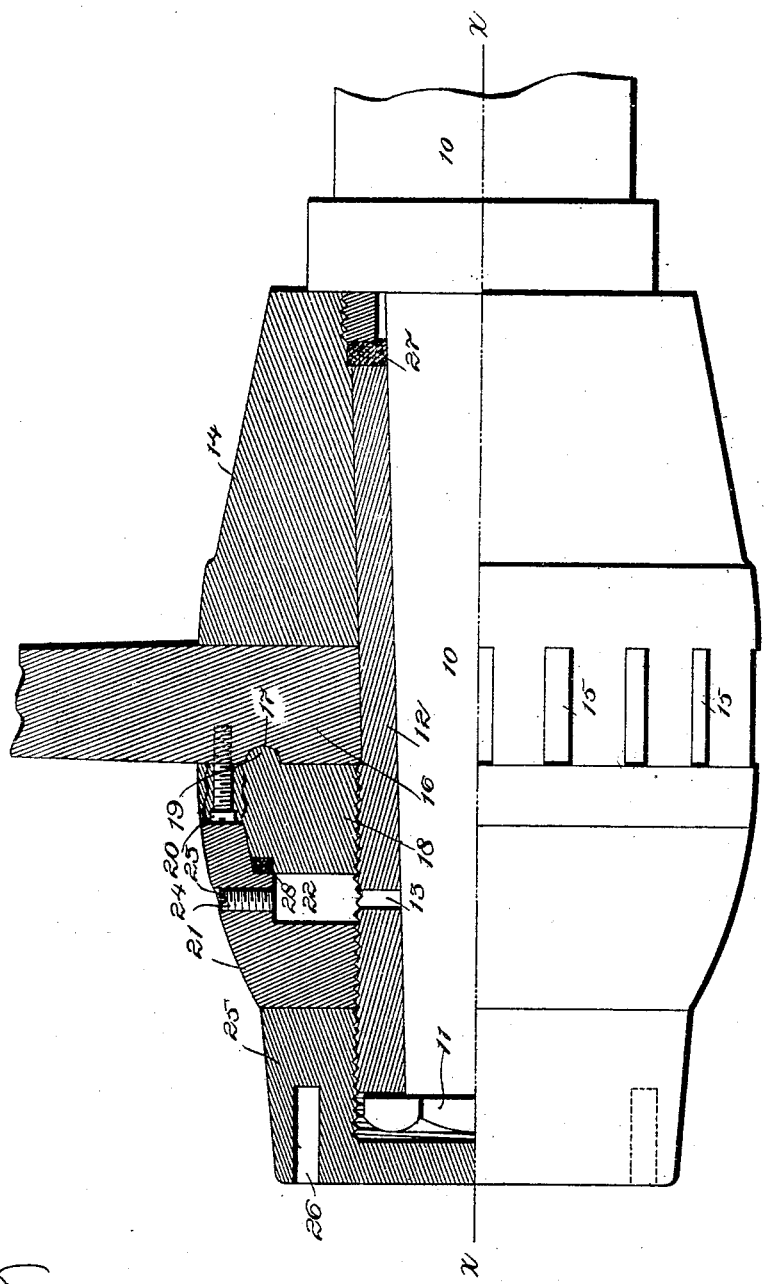
Witnesses:
A. T. Buford
Frank ...
Inventor:
Joseph Hartshorn

UNITED STATES PATENT OFFICE.

JOSEPH HARTSHORN, OF STUART, IOWA, ASSIGNOR OF ONE-HALF TO SAMUEL C. MAINS, OF SAME PLACE.

VEHICLE-WHEEL HUB.

SPECIFICATION forming part of Letters Patent No. 630,883, dated August 15, 1899.

Application filed August 29, 1898. Serial No. 689,817. (No model.)

*To all whom it may concern:*

Be it known that I, JOSEPH HARTSHORN, a citizen of the United States, residing at Stuart, in the county of Guthrie and State of Iowa, have invented a new and useful Wheel Hub and Lubricator, of which the following is a specification.

The object of this invention is, first, to provide a hub for vehicle-wheels which may be and preferably is made of metal and in which the wooden spokes may be quickly and easily introduced and then firmly clamped or secured in place; and in this connection my object is, further, to provide means whereby any shrinkage in the spokes tending to cause them to rattle in their mortises may be compensated for and the rattling prevented.

A further object is to provide a hub of this class in which a quantity of lubricating-oil may be stored and automatically fed to the wearing-surfaces of the hub and axle and the admission of dust, &c., to said wearing-surfaces prevented.

My invention consists in certain details of construction, arrangement, and combination of parts, as hereinafter more fully set forth, pointed out in my claims, and illustrated in the accompanying drawing, in which is shown a side elevation of the hub in place on an axle and having its upper portion above the indicated line $x\ x$ shown in vertical section.

Referring to said drawing, I have employed the reference-numeral 10 to indicate that portion of the vehicle-axle shown, having a nut 11 on its end, all of the usual kind.

The hub proper is composed of the metal axle-box 12, having an exterior screw-thread at its outer end and an oil-opening 13. On the inner end of the axle-box a hub-section 14 is secured, which section has the usual outer contour of a hub and is provided with mortises 15 for the spoke-tenons 16. This section extends only to the outer edge of said mortises, thus leaving said mortises open for the admission of tenons from the outer edge. A concentric circular groove 17 is formed in the outer face of this hub-section for purposes hereinafter made clear.

The reference-numeral 18 is used to indicate a clamping-collar internally screw-threaded to engage the outer surface of the axle-box and having a concentric circular bead or rib 19 on its inner face to enter the groove 17 and corresponding transverse grooves in the spoke-tenons 16. The outer end portion of the collar is smaller in diameter than the inner end portion, that is provided with bores through which screws 20 are extended into coinciding screw-seats in the hub-section 14 to rigidly connect the collar with said hub-section, as required to prevent the collar from rotating relative to the hub-section. An annular shoulder produced at the outer end and circumference of the collar by a further reduction of the diameter allows a packing-ring to be placed thereon contiguous to an oil-chamber in the outer section of the hub, as required to produce an oil-tight joint between the collar and the outer section of the hub. A second hub-section 21 is fitted to the outside face of the collar 18 to cover and conceal the screws 20 and is screwed to the outer end portion of the axle-box and has an internal chamber 22 formed therein and in position to communicate with the oil-opening 13. An oil-opening 23 provides access to the interior of this chamber, and a screw 24 is used to close this latter opening and prevent the entrance of dust. A nut 25 is screwed to the end of the axle-box and is shaped to form the outer end of the hub. In its outer face are two openings 26, designed to admit a spanner, whereby it may be turned on the axle-box. A washer 27 is provided at the inner end of the axle-box to engage the axle and prevent the escape of oil or the admission of dust to the wearing-surfaces, and a like washer 28 is placed on the annular shoulder at the outer end of the collar 18. By this means a quantity of oil may be kept in the chamber within the hub and automatically fed to the wearing-surfaces.

In practical use it is obvious that the parts of the hub may be quickly and easily assembled and that the spokes will be firmly held in place and prevented from being drawn out by means of the bead or rib 19. The collar 18 is prevented from loosening by means of the screws 20, which prevent its turning on the axle-box. Furthermore, a reservoir for oil is provided within the hub and dust is excluded from the wearing-surfaces. In order to detach a wheel from the axle, it is necessary first to remove the hub-section or nut 25 with a spanner. Then the nut on the end of the axle may be removed to release the wheel. This is useful in preventing unauthorized persons from removing the wheel.

Having thus described my invention, what I claim as new therein, and desire to secure by Letters Patent of the United States therefor, is—

1. In a wheel hub and lubricator, a collar having a reduced diameter at its outer end, bores in its inner and largest end portion and an annular bead on its inner face in direct combination with a hub-section having a groove on its inner face to admit said annular bead on the collar and screw-seats coinciding with said bores in the collar, mortises in the said hub-section, spokes having grooves coinciding with the groove in the hub-section and set-screws extended through the bores in the collar into the screw-seats in the hub-section, and a second hub-section fitted to the outside face of the collar to cover said screws, as shown and described for the purposes stated.

2. A wheel hub and lubricator comprising an axle-box having an exterior screw on its outer end portion, an oil-vent in said portion, a hub-section having an annular groove in its inner face concentric with said box, screw-seats near its circumference and mortises for spoke-tenons, a collar having an internal screw, an annular bead on its inner face, an enlarged diameter at its inner end and bores in said portion to admit screws to extend therethrough into the screw-seats in the said hub-section and an annular shoulder at its small end for a packing-ring, a hub-section having an internal screw fitted to the outer end of the collar and provided with an oil-chamber, a screw-threaded bore intersecting said chamber, a screw fitted in the bore, a packing-ring on the annular shoulder at the outer end of the collar and a nut or cap having an internal screw to engage the exterior screw on the outer end of the box and fitted in size and form to engage the outer face of the outer hub-section, all arranged and combined as shown and described for the purposes stated.

3. An improved vehicle-hub comprising an axle-box having an oil-hole therein, a hub-section having spoke-mortises at its outer face fixed to the box, a collar secured to the box and designed to engage the spoke-tenons in said mortises, a hub-section secured to the box and having an oil-chamber therein to communicate with the said oil-hole, for the purposes stated.

4. An improved vehicle-hub comprising an axle-box having an oil-hole therein, a hub-section having spoke-mortises at its outer face fixed to the box, a collar secured to the box and designed to engage the spoke-tenons in said mortises, a hub-section secured to the box and having an oil-chamber therein to communicate with the said oil-hole, and a hub-section or nut screwed to the outer end of the axle-box to cover the end of the axle and to keep the aforesaid hub-section in place for the purposes stated.

5. An improved vehicle-hub comprising an axle-box having an oil-hole therein and screw-threaded on its exterior, a hub-section having spoke-mortises at its outer face, and also a groove therein, a collar designed to be screwed to the axle-box and having a bead or rib on its inner face, a screw for securing it to the first hub-section, a second hub-section screwed to the axle-box and having an oil-chamber therein to communicate with said oil-hole, and also an opening leading to the oil-chamber, means for stopping said hole, and a nut to cover the outer end of the axle screwed to the axle-box substantially as and for the purposes stated.

JOSEPH HARTSHORN.

Witnesses:
A. T. BUFORD,
FRANK CHILL.